March 25, 1924.
G. N. BLANCHARD
LATHE ATTACHMENT
Filed Feb. 8, 1922
1,488,029
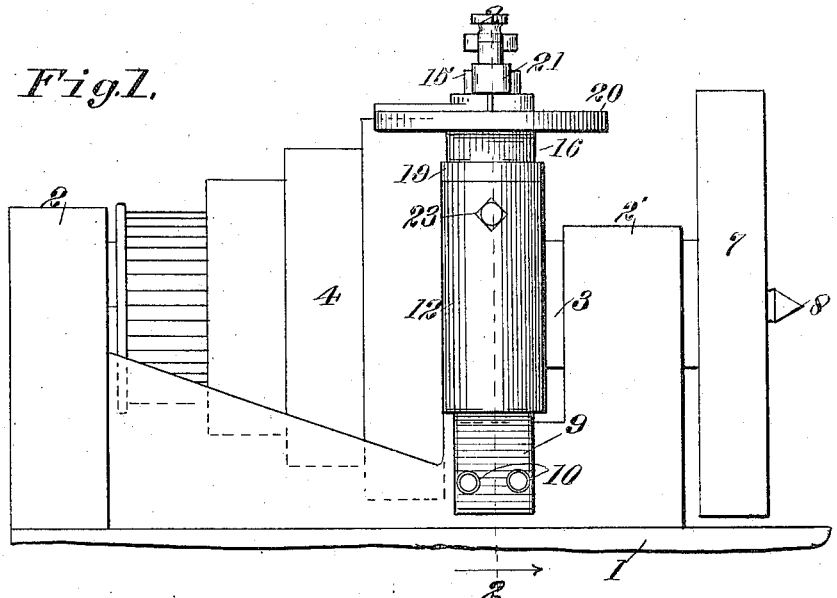
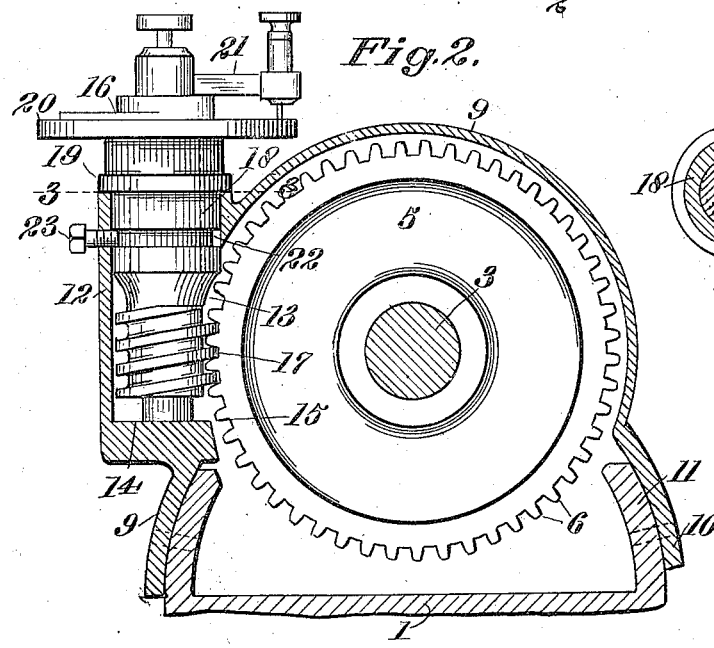
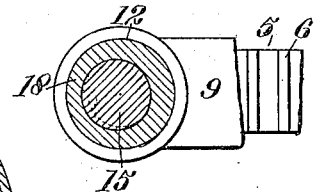
INVENTOR.
George N. Blanchard,
BY
ATTORNEYS.

Patented Mar. 25, 1924.

1,488,029

UNITED STATES PATENT OFFICE.

GEORGE N. BLANCHARD, OF OAKLAND, CALIFORNIA.

LATHE ATTACHMENT.

Application filed February 8, 1922. Serial No. 534,840.

*To all whom it may concern:*

Be it known that I, GEORGE N. BLANCHARD, a citizen of the United States, residing at Oakland, in the county of Alameda and State of California, have invented certain new and useful Improvements in Lathe Attachments, of which the following is a specification.

It is at present the practice in mounting a dividing head on a lathe of the usual construction to secure to the face plate a suitable gear, and to mount or associate therewith, an index head for obtaining the desired degree of rotation of the lathe spindle when desired. These attachments require considerable time in assembling and must be removed from the lathe before the lathe is adapted for the ordinary work, and this removal also requires considerable time, consequently in attaching and demounting an indexing or dividing head considerable time is required during which period the lathe is out of commission.

The present invention relates to a dividing head attachment for lathes, by the employment of which attachments to the face plate are dispensed with and the adjustment of the lathe spindle is accomplished by mounting the dividing head worm in operative relation with the main spindle driving gear. The invention further relates to the construction and arrangement of parts whereby a dividing head is adapted for removable association with the main spindle driving gear preferably through a permanent part of the lathe such as the guard for the main spindle driving gear, enabling the attachment and removal of the dividing head in comparatively short time, and without interfering with the face plate of the lathe.

Among the advantages of the present invention are the provision of a construction wherein a recess is formed preferably in the guard for the main spindle driving gear, and which intersects the periphery of the main spindle driving gear; another is to provide an indexing head shaft with an eccentric bushing for reception within a recess adapting the rotation of the bushing to move the indexing worm into and out of mesh with the teeth of the main spindle driving gear.

A further object is to provide a construction wherein the indexing head is capable of being positioned within its mounting recess, and which requires only the rotation of the bushing to throw the worm thereof into or out of mesh with the main spindle driving gear of the lathe.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Figure 1 is a view in front elevation of a common type of lathe with the preferred embodiment of my invention illustrated in connection therewith.

Figure 2 is a vertical sectional view taken on line 2—2 of Figure 1, and

Figure 3 is a transverse sectional view on line 3—3 of Figure 2.

In the drawings, 1 indicates a conventional head frame upwardly from opposite ends of which extend the bearing ends 2 and 2' rotatably mounting the lathe spindle 3 which carries the conventional stepped cones 4, main driving gear 5 of the usual spur tooth type 6, and at one end the lathe spindle carries the face plate 7 and the center 8. This construction is of the conventional form now used, and the main driving gear 5 is adapted to be protected by a guard 9 secured at its ends either permanently or detachably as at 10 to the side flanges 11 of the head frame 1.

My present invention consists in particular in employing a guard 9, and in forming therein a vertical or other bore or recess 12, open on its upper end and one side wall being open and communicating as at 13 with the periphery of the main driving gear 5. The recess or depression 12 at its base is illustrated in Figure 2 as having a supporting wall 14, and on said wall is adapted to rest the lower end of the shaft 15 of a conventional form of dividing head 16 of any well known type. The dividing head includes a worm 17 on shaft 15, a bushing 18 about the worm 17 rotatably mounted about the shaft 15 and having an eccentric periphery and a supporting flange 19 and the conventional index plate 20, index arm 21, and other necessary parts, to provide an operative indexing head. The bushing 18 of the indexing head is adapted to be removably positioned within the recess 12 through its upper open end with the flange 19 resting on the upper edge of the wall of said recess, and when so positioned the worm 17 lies opposite the main spindle driving gear 5. The rotation of the bushing 18 within the upper end of the recess 12 controls the degree of intermeshing of the teeth of the worm 17 with the teeth 6 of the worm wheel 5, and when said teeth 6 are in mesh with worm 17 it will be observed that the operation of the indexing arm will, through the worm 17, cause a rotation of the lathe spindle due to the meshing of the teeth 6 of the worm wheel with the worm 17. The bushing 18 is formed with an annular groove 22, and within the same is adapted for reception a lock screw 23 carried by the wall of the depression 12, which lock screw prevents an accidental displacement of the bushing 18 and removably retains the dividing head unit within the depression 12.

It will be observed that on the release of the screw 23 and the slight rotation of the bushing 18, the dividing head unit is adapted for easy and quick removal from the recess 12 adapting the lathe to ordinary work, and when it is desired to use the lathe for special work requiring an indexing or dividing head, it is only necessary that the operator insert the shaft of the dividing head unit into the depression 12, axially rotate the bushing 18 to intermesh the teeth of worm 17 with the main spindle driving gear 5 and adjust the lock screw 23.

I claim:—

1. In combination with the main spindle driving gear of a lathe, a guard overlying the periphery thereof and provided with an enlarged portion formed with a vertically disposed bearing opening, a dividing head including a shaft and a worm receivable as a unit within said bearing opening through its upper open end with the worm in mesh with said main spindle driving gear, and means engageable with the guard and dividing head for normally retaining the head in position within said opening.

2. In combination with the main spindle driving gear of a lathe, a guard therefor provided with a bearing opening disposed tangentially to the periphery of the main spindle driving gear and open at one end, a dividing head unit including a shaft, a bushing, and a worm adapted for removably positioning within said opening with the upper end of the dividing head projecting through the open end of the bearing opening, and with the worm intermeshing with the teeth of the main spindle driving gear, said bushing being held between the upper end of said head and worm, and a single member associated with the guard for removably retaining the head in position within the recess.

3. In combination with the main spindle driving gear of a lathe, a guard overlying the periphery thereof and provided with a bearing opening disposed tangentially of the main spindle driving gear, a dividing head unit including a shaft and a worm removably mounted within said bearing opening, an eccentric bushing between the shaft and wall of the bearing opening, and means engaging the guard for retaining the bushing within said opening.

In testimony whereof I have signed my name to this specification.

GEORGE N. BLANCHARD.